United States Patent [19]

Sanchez

[11] 3,872,402

[45] Mar. 18, 1975

[54] LASER GENERATOR HAVING A REDUCED EMISSION SPECTRUM

[75] Inventor: Francis Sanchez, Yerres, France

[73] Assignee: Commissariat a l'Energie Atomique, Paris, France

[22] Filed: Sept. 20, 1973

[21] Appl. No.: 399,265

[30] Foreign Application Priority Data

Oct. 6, 1972 France .............................. 72.35619

[52] U.S. Cl. ................................ 331/94.5, 350/290
[51] Int. Cl. ............................................. H015 3/08
[58] Field of Search ........... 331/94.5; 350/288, 290, 350/292, 172, 169, 171

[56] References Cited
UNITED STATES PATENTS
3,560,875 2/1971 Macken ......................... 331/94.5 C Primary Examiner—William L. Sikes
Attorney, Agent, or Firm—Flynn & Frishauf

[57] ABSTRACT

The laser generator comprises a suitably excited active medium placed within a resonator. The resonator is constituted by a mirror having a high coefficient of reflection and by a selective reflector assembly comprising a plurality of plates having parallel faces cut in a birefringent material in a direction parallel to the optical axis. The plates as well as their neutral lines are parallel to each other, each plate being preceded by a polarizer in which the direction of polarization makes an angle of 45° with the neutral lines.

11 Claims, 4 Drawing Figures

LASER GENERATOR HAVING A REDUCED EMISSION SPECTRUM

This invention relates to a laser generator having a reduced emission spectrum. Potential applications are in the field of physics and especially in optics, whenever it is desired to obtain a stimulated radiation having a narrow spectrum from a laser which is capable of emitting over a broad range of wavelengths.

There have already been a number of solutions to the problem involved in the reduction of a laser emission spectrum or the related problem of selection of longitudinal oscillating modes.

A first solution consists in coupling with the main laser resonator one or a number of auxiliary resonators which are very much shorter in length than the main resonator. The frequency coincidences between the resonances of the two resonators are such that only a few preferential modes are capable of oscillating. These devices result in highly complex structures in which it always proves a matter of difficulty to carry out adjustments; they are well suited to some types of relatively narrow-band lasers (gas lasers) but, since it is difficult to obtain broad spectral intervals between selected modes by means of these devices, they are unsuitable for use in lasers which have a very broad emission band as is the case in some solid-state lasers (neodymium-doped glass) or liquid lasers (dye lasers).

A second solution which has sometimes been adopted in the prior art consists in introducing into the main laser resonator a Fabry-Perot etalon which operates in transmission. This solution benefits by the advantages which are inherent in its great simplicity and is also particularly well suited to gas lasers in which the amplification curve of the active medium has a relatively small spectral width. In fact, the selection of modes by means of a Fabry-Perot etalon presupposes that the interval between two successive modes transmitted by the etalon is greater than approximately one-half the width of the amplification profile of the active medium. Postulating that $e$ is the thickness of the etalon, $n$ is the refractive index of the material constituting the etalon, $c$ is the velocity of light and $\Delta\lambda$ is the difference in wavelength between two modes transmitted by the etalon about the wavelength $\lambda$ and $\Delta f$ is the same difference expressed in terms of frequency, it can readily be seen that these values are related by the equations:

$\Delta f = c/2en$ and $\Delta\lambda = \lambda^2 c/2en$

If the lasers employed have a relatively narrow amplification profile of the order of a few thousand megacycles per second, which corresponds in wavelength to a line width of the order of a few hundredths of Angstrom, it is possible to obtain a spectral interval of this order between two transmitted modes by means of a Fabry-Perot etalon having a thickness of approximately 2 centimeters. On the other hand, if the profile is of distinctly greater width than a few hundredths of Angstrom, which is the case in particular with some solid-state lasers and dye lasers, it is practically no longer possible to obtain a Fabry-Perot etalon which is capable of selecting only a narrow frequency range from the entire amplification profile; for example, in the case of a width of the amplification profile of 200 A requiring a free spectral interval of the selecting etalon of approximately 100 A, the thickness $e$ is reduced to approximately 30 $\lambda$. While it is not strictly speaking impossible to provide a plate of this type, it is nevertheless apparent that considerable difficulties are involved in fabrication since the properties of a Fabry-Perot etalon largely depend on the parallelism of its faces, on their state of surface and also on the general orientation of the etalon, all these characteristics being difficult to maintain in the case of plates which have such a small thickness.

The invention is specifically directed to a laser which can have a very broad band and is provided with a mode-selecting and consequently spectrum-reducing system which overcomes the above-mentioned disadvantages of the devices of the prior art. The invention therefore finds a preferential field of application in lasers of the type having a broad amplification band and comprising in particular the ruby lasers, the neodymium-doped and dye lasers. This is clearly not the only potential field, however, since the invention can also apply to certain types of gas laser, especially the relatively broad-band ion lasers.

More specifically, the invention is directed to a laser generator having a reduced emission spectrum and comprising a suitably excited active medium placed within a resonator, said laser generator being distinguished by the fact that said resonator is constituted by a mirror having a high coefficient of reflection and by a selective reflector assembly comprising a plurality of plates having parallel faces cut in a birefringent material in a direction parallel to the optical axis, said plates as well as their neutral lines being parallel to each other, each plate being preceded by a polarizer in which the direction of polarization makes an angle of 45° with said neutral lines.

In a preferential alternative embodiment of the invention, the laser generator is transparent by the fact that the reflector assembly comprises plates in which the characteristics and positions are such that the optical thicknesses encountered by the light rays as well as the thicknesses of birefringence form geometric progressions. In one particular embodiment, said geometric progressions have a ratio of 2 in regard to the optical thicknesses and a ratio of 4 in regard to the thicknesses of birefringence.

The characteristic features and advantages of the invention will in any case become more readily apparent from the following description of exemplified embodiments which are given by way of explanation without any limitation being implied, reference being made in the description to the accompanying drawings in which.

Figure 1:
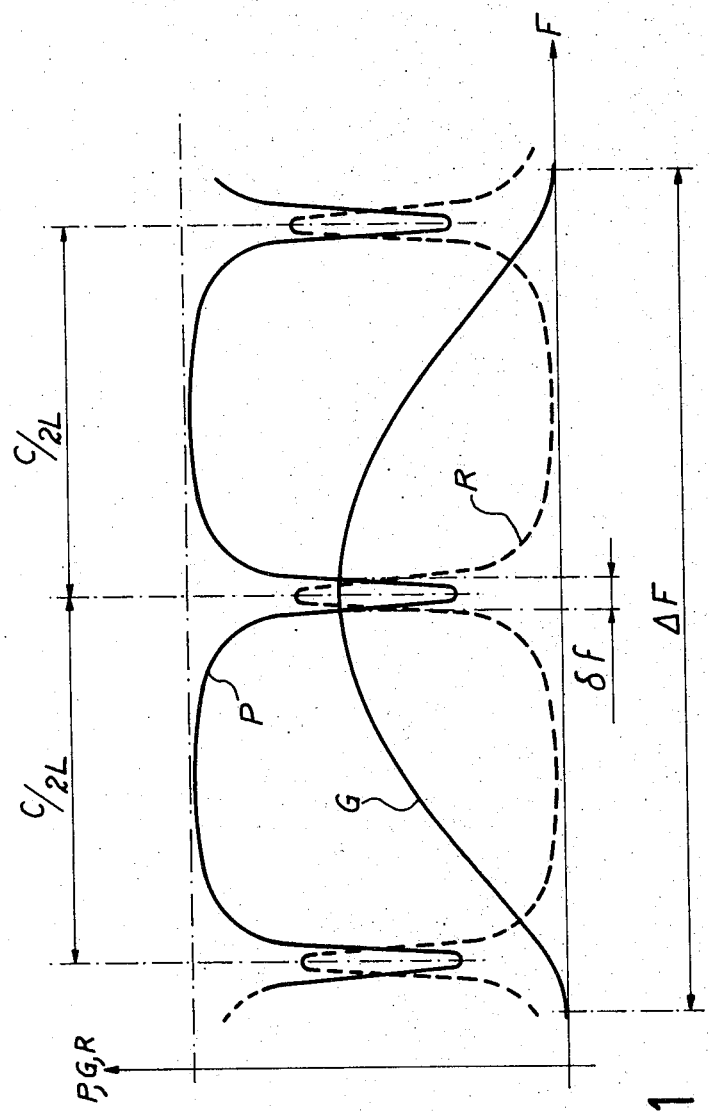
FIG. 1 is a diagram illustrating the principle of reduction of a laser spectrum by means of a selective reflector.

There is shown in FIG. 1 a diagram which provides an understanding of the principle involved in the reduction of a laser spectrum by means of a selective reflector. In this figure, the axis of abscissae is the axis of the frequencies F; the axis of ordinates represents alternately the gain G of the laser amplifying medium, the losses P of the resonator in which said amplifying medium is located or, equivalently, the coefficient of reflection R of one of the mirrors if the other mirror has a unitary coefficient of reflection. The curve G represents the variations in the gain of the amplifying medium of a laser as a function of the frequency; the width at the base of the curve is $\Delta F$. The amplifying medium is placed within a resonator, the losses of which are represented by the curve P; FIG. 1 corresponds to the ideal case in which the curve of variations of losses as a function of the frequency is such that only the central portion of the gain curve of the amplifying medium results in stimulated emission; in fact, in this central portion having a width $\delta f$, the gain of the amplifying medium exceeds the losses, which is the evident condition of oscillation; at any other frequency, the losses exceed the gain and oscillation is impossible; this naturally presupposes that the pitch of the curve P is at least of the order of the half-width $\Delta F/2$ of the gain curve. It amounts to the same thing to consider the coefficient of reflection of the reflector assembly rather than the losses of the resonator if it is assumed that the other mirror which forms the cavity has a coefficient of reflection equal to unity; the curve R which is obtained by taking the complement to unity of P therefore represents the ideal coefficient of reflection which it is desired to obtain. The invention is directed to a laser which is provided with a selecting system having a reflectivity of this order.

Figure 2:
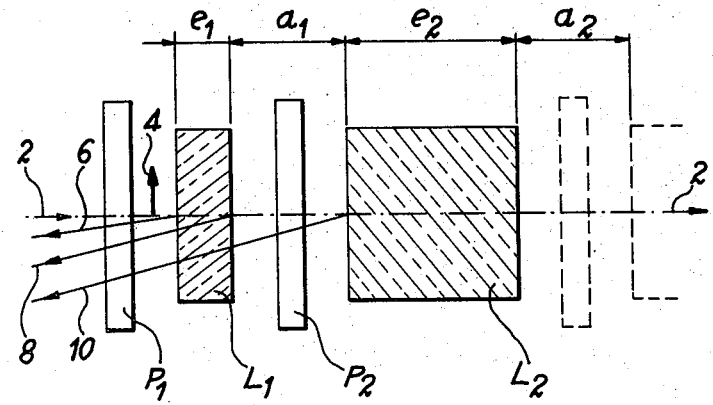
FIG. 2 is a reflector assembly in accordance with the invention.

The reflector assembly which permits the achievement of this result is shown generally in FIG. 2. In this figure, a light beam 2 encounters successively a first polarizer $P_1$, a plate $L_1$ having parallel faces and a thickness $e_1$, a polarizer $P_2$, a plate $L_2$ having parallel faces and a thickness $e_2$, and so forth; the plates having parallel faces $L_1$, $L_2$, and so forth are cut in a birefringent material in a direction parallel to the optical axis of said material; all the plates as well as their neutral lines are in parallel relation. The plates are separated by intervals $a_1$, $a_2$, and so forth. Each plate is preceded by a polarizer in which the direction of polarization makes an angle of 45° with said neutral lines. Only two plates together with their associated polarizers are shown in FIG. 2 but the selective reflector assembly which is employed in the invention may comprise a plurality of plates and especially more than two of these latter.

The operation of this assembly takes place in accordance with the following procedure. The incident light beam 2 strikes the first polarizer $P_1$ which is favorable to one direction of polarization but is not necessarily a total polarizer as will be explained hereinafter; for the sake of simplicity of the description, it may be assumed that the polarization of the incident radiation at the rear end of the polarizer $P_1$ is directed as indicated by the arrow 4, that is to say in the plane of the figure; it will also be assumed that the polarizers have negligible losses. The polarized incident beam is subjected to partial reflection from the entrance face of the plate $L_1$, thus giving rise to a reflected beam 6; similarly, that portion of the beam which is transmitted through the entrance face of the plate $L_1$ undergoes partial reflection from the exit face of said plate, thus giving rise to a second reflected beam 8; similarly again, that portion of the incident light beam 2 which has traversed the plate $L_1$ finally undergoes partial reflection from the entrance face of the plate $L_2$, thus giving rise to a partial beam 10 which again traverses the polarizer $P_2$ and then the plate $L_1$ and finally the polarizer $P_1$. In actual fact, the reflected beams 6, 8 and 10 coincide with the direction of the incident beam 2; for the sake of enhanced clarity, however, and as is customary practice in this type of representation, the reflected beams have purposely been shown in angularly displaced relation in order that they may be more clearly distinguished from each other.

Although it would be necessary to study the interferences of all the partial beams reflected from the different dioptric elements encountered by the incident light beam 2 in order to analyze the performance of the reflector assembly, the present description can be limited for the sake of simplicity solely to the beams 6, 8 and 10 which have been defined in the foregoing. If the plate $L_1$ were not birefringent, there would thus be found a purely interferometric phenomenon of the type encountered in a Fabry-Perot etalon having untreated faces. It is known that this phenomenon results in maximum reflection in the case of a series of frequencies having a relative spacing corresponding to a free spectral interval which has a value equal to $c/2e_1 n_1$, if $e_1$ and $n_1$ designate respectively the thickness and refractive index of the plate $L_1$. The presence of birefringence in the plate $L_1$ adds a second phenomenon of polarimetric nature to this purely interferometric phenomenon. Thus, in order that the partial beams 6 and 8 may be capable of interfering constructively, it is necessary to ensure that the initial polarization which is represented by the vector 4 and which is that of the reflected beam 6 is again present after a first traversal through the plate $L_1$, a reflection from the exit face and a second traversal through said plate; the phase shift between the beam 6 which has not made the traversal through the birefringent material and the beam 8 which has made said traversal twice is equal to $2\pi \cdot 2e_1 \Delta n_1/\lambda$ if $\Delta n_1$ represents the difference in indices along the two neutral lines of the birefringent plate $L_1$; the series of wavelengths at which the beams 6 and 8 have the same polarizations is therefore defined by the condition:

$2\pi \cdot 2e_1 \Delta n_1 /\lambda = 2K\pi$, $k$ being an integer, that is, consideration being given to the frequencies F:

$F = k \cdot c/2e_1 \Delta n_1$

The free spectral interval is in that case $c/2e_1 \Delta n_1$. It may therefore be considered that the birefringent plate $L_1$ is equivalent to a plate of optical thickness $e_1 \Delta n_1$, which would be made of homogeneous material and the interferometric behavior of which would be studied. In other words, in order to study the interferences between the partial beams 6 and 8, it is necessary to study simultaneously the interferometric conditions corresponding to a plate of optical thickness $e_1 n_1$ and the polarimetric conditions corresponding to a fictitious equivalent plate of thickness $e_1 \Delta n_1$; in the following description, the expression "thickness of birefringence" will be employed to designate the quantity $e_1 \Delta n_1$.

It is also useful to study the influence of the beam 10 which is derived from the partial reflection from the entrance face of the plate $L_2$; this beam traverses the polarizer $P_2$ and is accordingly polarized as it enters the plate $L_1$; the state of said ray after this latter has passed through the plate $L_1$ is therefore the state which would be obtained in an equivalent manner if consideration were given to a beam which had passed twice through a plate having a thickness of one-half; the partial beams derived from reflections from the dioptric elements located beyond the polarizer $P_2$ can therefore be considered as coming from a homogeneous fictitious equivalent plate of thickness $e_1 \Delta n_1/2$.

To summarize it may therefore be stated that one of the birefringent plates having a thickness $e$, a refractive index $n$, a birefringence $\Delta n$, and placed under the conditions shown in FIG. 2 is equivalent to a fictitious system of three homogeneous plates which would have the optical thicknesses $en$, $e\Delta n$ and $e\Delta n/2$. The advantage of a device of this type is readily apparent: the small value of $\Delta n$ (in the case of quartz, for example, $\Delta n = 10^{-2}$) results in broad spectral intervals without entailing any need to form plates of very small thickness.

Figure 3:
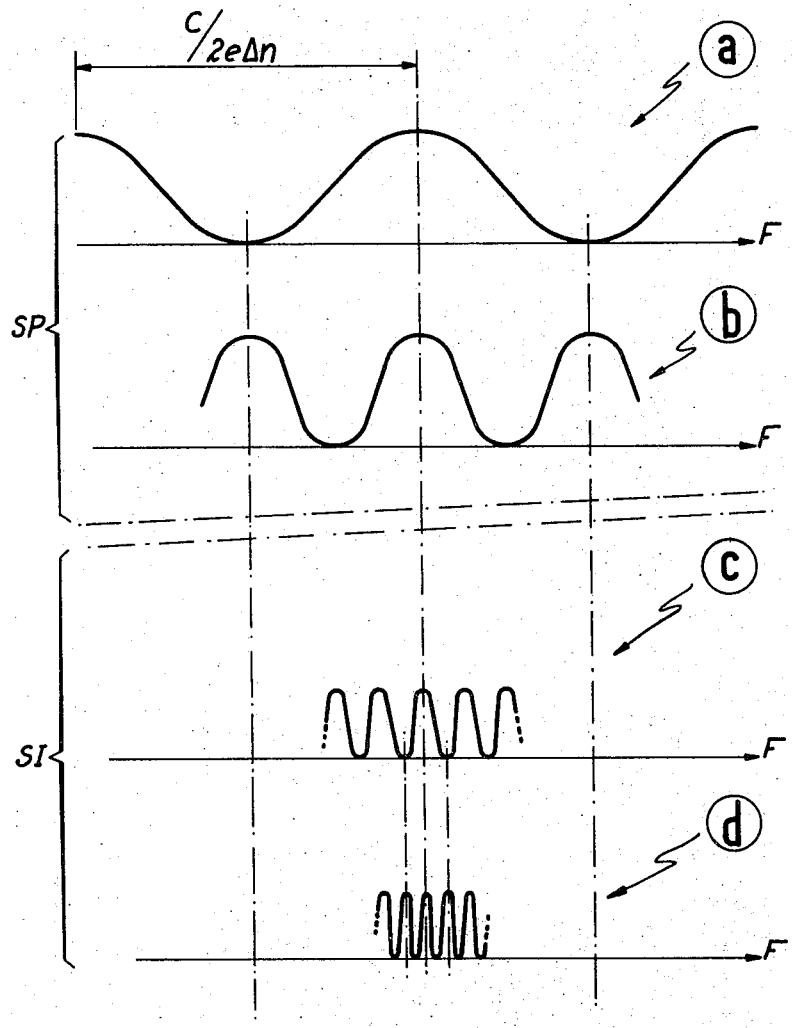
FIG. 3 is a set of selective reflection curves of the different filters which constitute the reflector assembly.

If N collimated plates are employed, it is apparent from the foregoing that the reflector assembly is equivalent to $2N-1$ pairs of dioptric elements which give rise to interferometric phenomena, N fictitious plates having a thickness of birefringence $e\Delta n$ and N fictitious plates having a thickness of birefringence $e \Delta n/2$, namely a total of $4N-1$ elementary filters. If the plates were not birefringent as in the systems of the prior art, the number of elementary filters would only be $2N-1$. From this equivalence it is possible to understand how a very selective reflector assembly can be obtained by means of a plurality of birefringent plates which are placed between polarizers as illustrated in FIG. 3.

In this figures, there is shown a series of reflection curves of the different elementary filters which constitute the reflector assembly. FIG. 3a represents the reflection curve of the plate which has the smallest thickness of birefringence, namely $e_1 \Delta n_1$; the free spectral interval is $c/2e_1 \Delta n_1$. This thickness of birefringence is so calculated that the corresponding free spectral interval exceeds one-half the half-bandwidth $\Delta F/2$ of the amplification profile of the active medium employed. In consequence and as already explained in connection with FIG. 1, a system of this type is alone capable of selecting a range which is central but relatively broad on account of the low selectivity of the reflection curve. If this range is considered to be too broad, it is necessary to add to said first reflection curve a second curve which limits the selected range of oscillation to a greater extent; to this end, it is necessary to ensure that the free spectral interval of said second selective reflection curve is smaller than the previous free spectral interval. It has been assumed in FIG. 3 $b$ that the spectral interval of said second curve was one-half the interval shown in FIG. 3a.

It is thus possible to associate a series of curves by giving consideration only to phenomena of a polarimetric nature; there is accordingly obtained a "polarimetric series" P.S. The curves of said polarimetric series culminate in a value which is equal theoretically to 1 if the losses in the polarizers are assumed to be zero. The total reflection of an assembly of this type is obtained by finding the product of the reflections produced by each element; this reflection attains unity if there is perfect coincidence between the different maximum values.

As has been explained earlier, the broad free spectral intervals of the polarimetric series can readily be obtained by the phenomenon of birefringence and by the presence of polarizers; nevertheless, since it is necessary to employ thicknesses of birefringence which increase progressively in the polarimetric series, there appears a limit beyond which the desired free spectral interval can more readily be ensured by making use of the interferometric phenomenon instead of the polarimetric phenomenon. This transistion takes place when the free spectral interval $c/2e \Delta n$ of polarimetric origin is close to a free spectral interval of interferometric origin.

In FIG. 3c, there is thus shown a reflection curve which has an interferometric origin and which is defined by a free spectral interval of the form $c/2en$. In order to refine the range of oscillation even further, this curve is associated with curves of smaller spectral intervals; by way of example, FIG. 3d shows the ultimate curve of selective reflection which characterizes this second series — designated hereinafter as the "interferometric series" IS — and the spectral interval of which is one-half the value of the previous interval.

If the mean refractive indices of the N plates are designated by $n_1, n_2 \ldots n_N$, the maximum coefficient of reflection R which can be obtained is given by the standard formula:

$$R = (1 - n^2_1 n^2_2 \ldots n^2_N / 1 + n^2_1 n^2_2 \ldots n^2_N)^2$$

this clearly presupposes that the maximum values of reflection of each plate all coincide. Since the polarimetric series introduces a selective reflection which can theoretically culminate in unity, the maximum reflection of both the polarimetric and interferometric series can therefore attain in principle the above-mentioned value R.

So far as selective reflection is concerned, the system as a whole is therefore characterized by a set of two series, namely a polarimetric series and an interferometric series, which are adapted to each other in the sense that one series relays the other. In FIG. 3, the free spectral intervals are shown solely by way of explanation in a geometric progression having a ratio of 2. It is apparent, however, that this is not a strict condition since it would be equally feasible to choose a geometric progression having a ratio of 2.5 or 3, the essential requirement being that the composition of all these curves should give rise to a single range of possible oscillation in the case of the associated laser. The factor of 2 is nevertheless advantageous since certain maximum values of a reflection curve can thus be caused to coincide with minimum values of the preceding curve and singleness of the range selected is accordingly guaranteed. In practice, it is therefore possible to select optical thicknesses $e_1 n_1$, $e_2 n_2$, etc . . . of the different plates and the intervals $a_1, a_2$, etc . . . of the air gaps formed between the plates $L_1, L_2$, etc., with the result that all the optical thicknesses of the $2N-1$ pairs of dioptric elements together form a geometric progression having a ratio of 2 or in the vicinity of 2.

So far as concerns the polarimetric series, the ratio of the geometric progression formed by the free spectral intervals can also be advantageously in the vicinity of 2. Nevertheless, it has been seen that a plate having a thickness $e$ and a variation in index $\Delta n$ is equivalent from the polarimetric point of view to a first fictitious plate having an optical thickness $e\Delta n$ and to a second fictitious plate having a thickness $e\Delta n/2$; if a second plate of thickness $2e$ is employed, said plate is equivalent to three plates having thicknesses $2en$, $2e\Delta n$ and $2e\Delta n/2$; a third plate of thickness $4e$ is equivalent to three plates having respective thicknesses $4en$, $4e\Delta n$ and $4e\Delta n/2$. The plate of thickness $2e$ consequently appears to be superfluous from the polarimetric point of view since it gives rise to fictitious plates which have already been introduced by the plates having thicknesses $e$ and $4e$. In order that spectral intervals in a geometric progression having a ratio of 2 may be obtained in the polarimetric series, it is therefore only necessary to employ plates in which the thicknesses of birefringence $e\Delta n$ form a geometric progression having a ratio of 4. The geometric series will be adapted if the greatest thickness of birefringence is substantially one-half the value of the smallest optical thickness. If the ratio of the geometric progressions is equal to 2, it is apparent that the power of reduction of the spectrum of the N-plate assembly is considerable and in the vicinity of $2^{4N-1}$. In the case in which $N = 3$, the reflector assembly is equivalent to $4N-1 = 11$ elementary filters, thereby resulting in a spectrum reduction power of $2^{11} \simeq 2000$.

If the foregoing conditions are difficult to fulfil in some practical cases in which plates of correct thickness or refractive index are not available, thinner and slightly inclinable plates can always be associated with given plates in order that the desired thicknesses or birefrigences may thus be attained.

The polarizers $P_1$, $P_2$, etc. must have a direction of polarization which makes an angle of 45° with the neutral lines of the plates. However, there is no requisite condition in regard to the orientation of the directions of polarization with respect to each other: these directions of polarization are not necessarily in parallel relation in all cases and some directions can make an angle of 90° with the others. It is wholly apparent, however, that the rotation of a polarizer through 90° modifies the conditions of propagation within the system and shifts the selected frequency.

Figure 4:
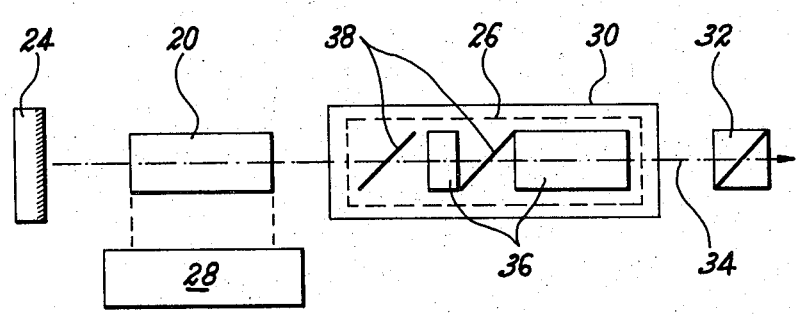
FIG. 4 is a diagram of a laser having a reduced emission spectrum.

The intrinsic operation of the selective reflector assembly having thus been described, consideration can now be given to the operation of the laser generator which forms the subject of the invention and is illustrated in FIG 4. In this figure, an active medium 20 is placed in a resonator constituted on the one hand by a mirror 24 having a coefficient of reflection which is close to unity and on the other hand by the selective reflector assembly 26 which has just been described; the active medium is excited by suitable means 28 and especially optical means; the reflector assembly 26 is placed within a thermostatically controlled chamber 30; a polarizer 32 can be disposed if necessary on the path of the light beam 34 which comes from the laser generator; the assembly 26 comprises a plurality of birefringent plates 36 and polarizers 38, only two pairs of which have been shown for the sake of enhanced clarity.

The operation of a laser generator of this type is as follows. The active medium 20 has a very broad amplification spectrum within which it is desired to select a narrow range. This is the design function of the selective reflector 26. The beam 24 which emerges from the laser generator therefore has a narrow spectrum. The selected frequency depends on the properties of reflectivity of the assembly 26; since the birefringence is sensitive to temperature, it is necessary in the first place to ensure that said assembly is thermostatically controlled in order to obtain stable spectral properties, which is achieved by means of the thermostatically controlled chamber 30; by adjusting the temperature of said chamber, it is possible in the second place to displace the selected frequency and consequently to obtain a light beam 34 having a tunable wavelength.

The polarizers 38 are located within the laser cavity and therefore need not provide total polarization. In fact, as is already known, it is only necessary to utilize tilted homogeneous plates within a laser cavity in order to ensure that the stimulated radiation is totally polarized in the plane of incidence. On the other hand, the polarizer 32 which is located outside the cavity must be of the total polarization type if it is employed for the purpose of selecting a particular polarization whenever this may prove necessary; use can accordingly be made of a Glan prism or of any other known device.

The reflector element 26 is not provided with either reflecting or transparent films and is therefore completely achromatic; this makes it possible to employ the element with a wide range of different lasers in which the emission wavelength is not necessarily the same. For example, in the case of the dye lasers, it is particularly convenient to employ the above-defined reflector element for different dyes in which the emission ranges are distributed over a broad spectrum from red to blue. From this it follows that solutions of rhodamine 6G or of rhodamine B or fluorescein, or coumarin and so forth can be employed with the same system 26 without any need to modify the selector. The absence of films also makes it possible to construct lasers of the type contemplated by the invention for very high emitted powers without any attendant danger of impairment (pulsed operation using a neodymium-doped glass rod, for example, as an amplifying medium or continuous operation using a YAG rod, for example).

In regard to the nature of the birefringent plates and without limiting the invention to these materials alone, the use of quartz or of spar is worthy of mention. The plates 38 which serve as polarizers can be plates of homogeneous silica.

While the reflector assembly which is used in the laser according to the invention may be likened in some respects to the Lyot filter, it is apparent from this description that the assembly differs from this latter in many particulars:

the plates $L_1$, $L_2$, etc. are collimated with precision whereas they must not be parallel in the Lyot filter;

the thicknesses of birefringence $e\Delta n$ of the plates can form a geometric progression having a ratio of 4 whereas the ratio is only 2 in the case of the Lyot filter;

the assembly operates in reflection whereas the Lyot filter operates in transmission, thus making it necessary to reduce the reflections by means of nonreflecting films (which makes the plate chromatic) or by means of adapted media which surround the elements;

the polarizers may not be of the total polarization type and can be constituted by simple tilted plates whereas, in the Lyot filter, the polarizers are total and therefore complex, costly and fragile.

What we claim is:

1. A laser generator having a reduced emission spectrum and comprising a suitably excited active medium placed within a resonator, wherein said resonator is constituted by a mirror having a high coefficient of reflection and by a selective reflector assembly comprising a plurality of plates having parallel faces cut in a birefringent material in a direction parallel to the optical axis, said plates as well as their neutral lines being parallel to each other, each plate being preceded by a polarizer in which the direction of polarization makes an angle of 45° with said neutral lines.

2. A laser generator according to claim 1, wherein the series of optical thicknesses of the plates and of the intervals between plates form a geometric progression.

3. A laser generator according to claim 2, wherein the ratio of said geometric progression is in the vicinity of 2.

4. A laser generator according to claim 1, wherein the thicknesses of birefringence of the plates form a geometric progression.

5. A laser generator according to claim 4, wherein the ratio of said geometric progression is in the vicinity of 4.

6. A laser generator according to claim 3, wherein the greatest thickness of birefringence is substantially one-half the value of the smallest optical thickness.

7. A laser generator according to claim 1, wherein said polarizers are transpprent plates which are inclined to the axis of the generator.

8. A laser generator according to claim 1, wherein said generator further comprises a total polarizer after the last birefringent plate.

9. A laser generator according to claim 1, wherein the reflector assembly is placed within a thermostatically controlled adjustable-temperature chamber.

10. A laser generator according to claim 1, wherein the active medium is a neodymium-doped glass.

11. A laser generator according to claim 1, wherein the active medium is a liquid solution in which the solute is a dye.

* * * * *